United States Patent
Kim et al.

(10) Patent No.: US 12,223,638 B2
(45) Date of Patent: Feb. 11, 2025

(54) DISPLAY DEFECT DETECTION SYSTEM AND DETECTION METHOD THEREOF

(71) Applicant: LG Display Co., Ltd., Seoul (KR)

(72) Inventors: Ki Hyun Kim, Paju-si (KR); Jong Ju Hong, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 445 days.

(21) Appl. No.: 17/891,714

(22) Filed: Aug. 19, 2022

(65) Prior Publication Data

US 2023/0186455 A1 Jun. 15, 2023

(30) Foreign Application Priority Data

Dec. 14, 2021 (KR) .................. 10-2021-0178480

(51) Int. Cl.
*G06T 7/00* (2017.01)
*G06T 5/70* (2024.01)
(Continued)

(52) U.S. Cl.
CPC ............. *G06T 7/0008* (2013.01); *G06T 5/70* (2024.01); *G06T 7/13* (2017.01); *G06T 7/70* (2017.01);
(Continued)

(58) Field of Classification Search
CPC ............. G06T 11/008; G06T 2210/41; G06T 2211/424; G06T 11/006; G06T 5/50; G06T 7/30; G06T 2207/10088; G06T 2207/10104; G06T 2207/20004; G06T 2207/20076; A61B 6/037; A61B 6/4417; A61B 6/5205; A61B 6/5247

See application file for complete search history.

(56) References Cited

U.S. PATENT DOCUMENTS

| | | | | |
|---|---|---|---|---|
| 5,917,935 A | * | 6/1999 | Hawthorne | ........... G02F 1/1309 382/141 |
| 8,780,097 B2 | * | 7/2014 | Xu | .......................... G09G 3/006 345/596 |

(Continued)

OTHER PUBLICATIONS

Zhang et al, An Efficient Optical Mura Compensation System for Large Liquid-Crystal Display Panels, IEEE Transactions on Instrumentation and Measurement, vol. 71, 2022 5023213 (Year: 2022).*

(Continued)

*Primary Examiner* — Andrae S Allison
(74) *Attorney, Agent, or Firm* — Morgan, Lewis & Bockius LLP (57) ABSTRACT

A display defect detection system and a detection method thereof are disclosed. A display defect detection system includes a preprocessing circuit receiving a capture image of a test pattern, displayed by a display panel, as a panel image including diagonal Mura and preprocessing the panel image to output a preprocessing image and a Mura detection circuit calculating a final feature value of the diagonal Mura by multiplying a first feature value, in which a luminance difference of the diagonal Mura is reflected, by a second feature value in which a shape ratio of the diagonal Mura is reflected, on the basis of an edge map of the preprocessing image, and detecting a display position of the diagonal Mura on the basis of the final feature value of the diagonal Mura.

16 Claims, 7 Drawing Sheets

(51) Int. Cl.
*G06T 7/13* (2017.01)
*G06T 7/70* (2017.01)
*G06V 10/24* (2022.01)
*G06V 10/25* (2022.01)
*G06V 10/50* (2022.01)

(52) U.S. Cl.
CPC ............ *G06V 10/242* (2022.01); *G06V 10/25* (2022.01); *G06V 10/50* (2022.01); *G06T 2207/20182* (2013.01); *G06V 2201/07* (2022.01)

(56) References Cited

U.S. PATENT DOCUMENTS

| | | | |
|---|---|---|---|
| 10,379,397 B1* | 8/2019 | Tang | G02F 1/133512 |
| 11,232,736 B1* | 1/2022 | Kim | G09G 3/3275 |
| 2013/0100089 A1* | 4/2013 | Xu | G09G 3/006 |
| | | | 345/204 |
| 2017/0192303 A1* | 7/2017 | Kang | G02F 1/133608 |
| 2018/0108288 A1* | 4/2018 | Kuang | G09G 3/2092 |
| 2018/0158434 A1* | 6/2018 | Bian | G09G 3/006 |
| 2019/0191150 A1* | 6/2019 | Zhang | G06T 7/0004 |
| 2019/0258890 A1* | 8/2019 | Lee | G06F 18/15 |
| 2022/0076605 A1* | 3/2022 | Yang | G09G 3/2007 |
| 2022/0172664 A1* | 6/2022 | Park | G09G 3/2074 |
| 2022/0342248 A1* | 10/2022 | Shao | G02F 1/133516 |

OTHER PUBLICATIONS

Yang et al, Automatic TFT-LCD Mura Detection Based on Image Reconstruction and Processing, 2013 IEEE Third International Conference on Consumer Electronics—Berlin (ICCE—Berlin) (Year: 2013).*

* cited by examiner

DISPLAY DEFECT DETECTION SYSTEM AND DETECTION METHOD THEREOF

CROSS-REFERENCE TO RELATED APPLICATIONS

This application claims the benefit of the Korean Patent Application No. 10-2021-0178480 filed on Dec. 14, 2021, which is hereby incorporated by reference as if fully set forth herein.

BACKGROUND

Technical Field

The present disclosure relates to a display defect detection system and a detection method thereof.

Discussion of the Related Art

A display defect is a defect which occurs in a process of manufacturing a display panel, and various causes thereof include a malfunction of process facilities, a mistake of a worker, a fine drawback caused by dusts or motes, and a defect of a used film. When a display defect occurs, a screen characteristic of a display panel is not uniform and has a Mura state. There are various types (kinds), sizes, and levels of Mura, and particularly, Mura has various types such as a circular type, a linear type, a non-formal type, and a repeatedly smeared type.

There is a method where a worker directly detects Mura of a display panel with eyes. However, in such a detection method, eyes of a worker may be easily fatigued, a detection rate of a fine defect may be reduced, and a detection result may be changed by the subjective determination of a worker, and due to this, it is difficult to expect a constant-level detection result.

In a detection method using a Mura detection algorithm, because the boundary, brightness change, and contrast of a captured image are not clearly shown, a level of difficulty of Mura detection is high. Conventional algorithms are based on a contrast ratio, a standard deviation (STD), and an amplitude, but it is difficult to increase the accuracy of detection of diagonal Mura. The diagonal Mura has various line directions as well as various lengths of lines, and due to this, a detection method of the related art has a limitation in increasing the accuracy of detection.

SUMMARY

Accordingly, embodiments of the present disclosure are directed to a display defect detection system and a detection method thereof that substantially obviate one or more of the problems due to limitations and disadvantages of the related art.

An aspect of the present disclosure is to provide a display defect detection system and a detection method thereof, which may increase the accuracy of detection of diagonal Mura.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display defect detection system comprises a preprocessing circuit receiving a capture image of a test pattern, displayed by a display panel, as a panel image including diagonal Mura and preprocessing the panel image to output a preprocessing image and a Mura detection circuit calculating a final feature value of the diagonal Mura by multiplying a first feature value, in which a luminance difference of the diagonal Mura is reflected, by a second feature value in which a shape ratio of the diagonal Mura is reflected, on the basis of an edge map of the preprocessing image, and detecting a display position of the diagonal Mura on the basis of the final feature value of the diagonal Mura.

In another aspect, a display defect detection method comprises receiving a capture image of a test pattern, displayed by a display panel, as a panel image including diagonal Mura and preprocessing the panel image to output a preprocessing image, calculating a final feature value of the diagonal Mura by multiplying a first feature value, in which a luminance difference of the diagonal Mura is reflected, by a second feature value in which a shape ratio of the diagonal Mura is reflected, on the basis of an edge map of the preprocessing image, and detecting a display position of the diagonal Mura on the basis of the final feature value of the diagonal Mura.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure. In the drawings.

DETAILED DESCRIPTION

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on~", "over~", "under~", and "next~", one or more other parts may be disposed between the two parts unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

Figure 1:
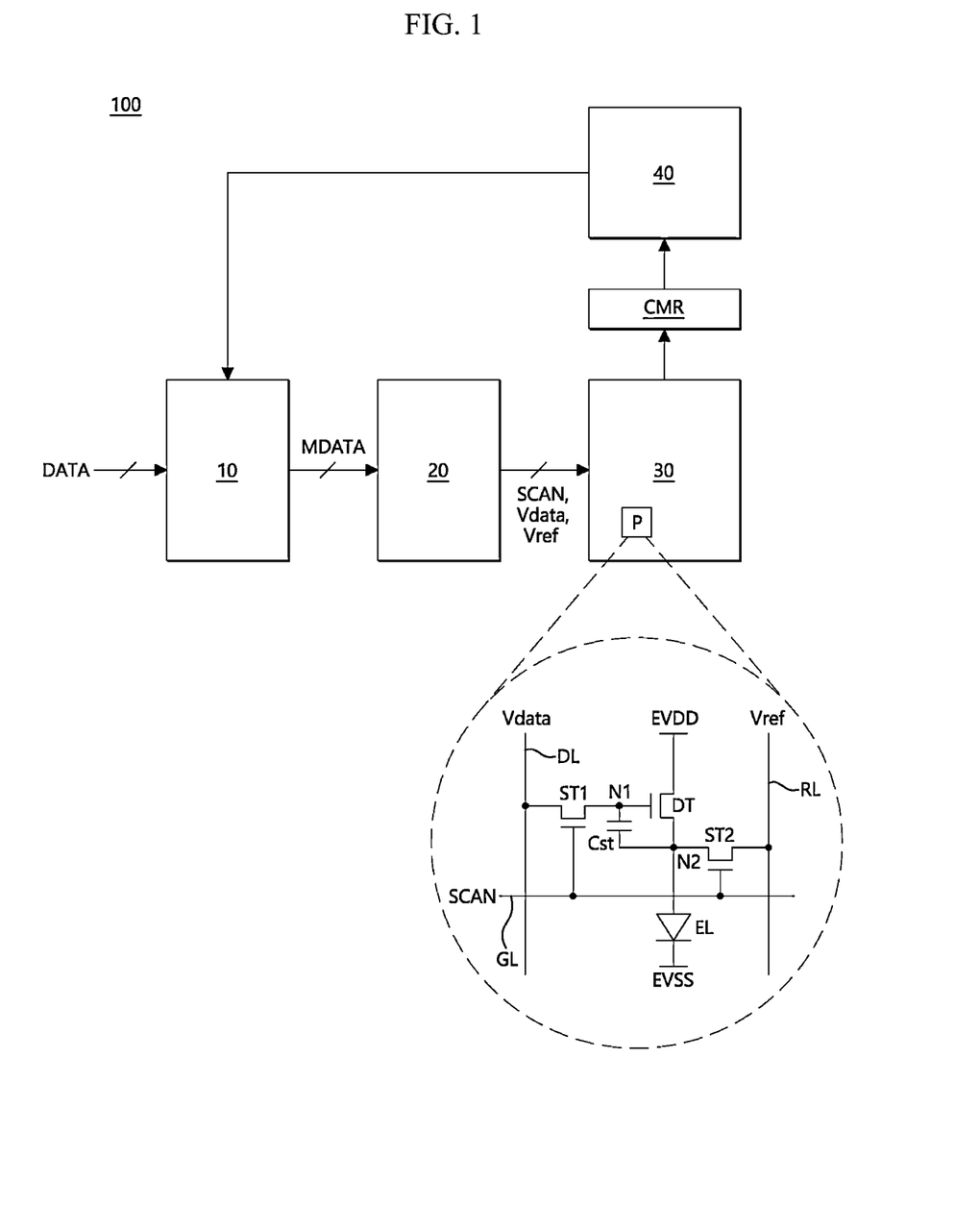
FIG. 1 is a diagram illustrating a display defect detection system according to an embodiment of the present disclosure.

FIG. 1 is a diagram illustrating a display defect detection system 100 according to an embodiment of the present disclosure.

Referring to FIG. 1, the display defect detection system 100 may include a display apparatus, a luminance measurer CMR, and a display defect detection circuit 40.

The display apparatus may be an electroluminescent display apparatus, but is not limited thereto and may be applied to various types of display apparatuses. For example, the display apparatus may be implemented as various types such as liquid crystal display apparatuses, electrophoresis display apparatuses, electro-wetting display apparatuses, and quantum dot display apparatuses. In the present embodiment, an electroluminescent display apparatus will be mainly described below.

The display apparatus may include a controller 10, a panel driver 20, and a display panel 30.

A screen including a plurality of pixel lines may be provided in the display panel 30, and a plurality of pixels P may be included in each of the plurality of pixel lines. Here, a "pixel line" may denote a set of signal lines and pixels P adjacent to one another in one direction. The signal lines may include a plurality of data lines DL for supplying data voltages Vdata to the pixels P, a plurality of reference voltage lines RL for supplying a reference voltage Vref to the pixels P, a plurality of gate lines GL for supplying a scan signal to the pixels P, and a plurality of high level power lines for supplying a high level pixel voltage EVDD to the pixels P. The reference voltage lines RL may be divided by pixel line units, for applying ACL which will be described below.

The pixels P of the display panel 30 may be arranged as a matrix type to configure a pixel array and may provide a screen which displays an image. Each of the pixels P may be connected to one of the data lines DL, one of the reference voltage lines RL, one of the high level power lines, and one of the gate lines GL. Each pixel P may be further supplied with a low level pixel voltage EVSS from the panel driver 20.

Each pixel P may include a light emitting device EL, a driving thin film transistor (TFT) DT, a plurality of switch TFTs ST1 and ST2, and a storage capacitor Cst, but is not limited thereto. The driving TFT DT and the switch TFTs ST1 and ST2 may each be implemented with an NMOS transistor, but are not limited thereto.

The light emitting device EL may be a light emitting device which emits light having strength corresponding to a pixel current applied from the driving TFT DT. The light emitting device EL may be implemented with an organic light emitting diode including an organic emission layer, or may be implemented with an inorganic light emitting diode including an inorganic emission layer. An anode electrode of the light emitting device EL may be connected to a second node N2, and a cathode electrode thereof may be connected to an input terminal for the low level pixel voltage EVSS.

The driving TFT DT may be a driving element which generates a pixel current on the basis of a gate-source voltage thereof. A gate electrode of the driving TFT DT may be connected to a first node N1, a first electrode thereof may be connected to an input terminal for the high level pixel voltage EVDD through the high level power line, and a second electrode thereof may be connected to the second node N2.

The switch TFTs (for example, first and second switch TFTs) ST1 and ST2 may be switch elements which set the gate-source voltage of the driving TFT DT and connect the second electrode of the driving TFT DT to the reference voltage line RL.

The first switch TFT ST1 may be connected between a data line DL and the first node N1 and may be turned on based on a scan signal SCAN from a gate line GL. The first switch TFT ST1 may be turned on in programming for image driving. When the first switch TFT ST1 is turned on, the data voltage Vdata may be applied to the first node N1. A gate electrode of the first switch TFT ST1 may be connected to the gate line GL, a first electrode thereof may be connected to the data line DL, and a second electrode thereof may be connected to the first node N1.

The second switch TFT ST2 may be connected between the reference voltage line RL and the second node N2 and may be turned on based on the scan signal SCAN from the gate line GL. The second switch TFT ST2 may be turned on in programming for image driving and may apply a reference voltage Vref to the second node N2. A gate electrode of the second switch TFT ST2 may be connected to the gate line GL, a first electrode thereof may be connected to the reference voltage line RL, and a second electrode thereof may be connected to the second node N2.

The storage capacitor Cst may be connected between the first node N1 and the second node N2 and may hold a gate-source voltage of the driving TFT DT during a certain period.

The controller 10 may include a timing controller and a data modulator.

The timing controller may control an operation timing of the panel driver 20 with reference to timing signals (for example, a vertical synchronization signal Vsync, a horizontal synchronization signal Hsync, a dot clock signal DCLK, and a data enable signal DE) input from a host system.

The data modulator may modulate video data DATA input from the host system with reference to a predetermined Mura compensation table. Compensation values corresponding to position information about target Mura defected by the display defect detection circuit 40 may be stored at gray levels in the Mura compensation table. The data modulator may transfer modulated image data MDATA to the panel driver 20 through an internal interface.

The panel driver 20 may drive the pixels P included in the screen of the display panel 30. The panel driver 20 may include a data driver which drives data lines DL connected to the pixels P, a gate driver which drives gate lines GL connected to the pixels P, and a power driver which drives reference voltage lines RL connected to the pixels P and high level power lines connected to the pixels P.

The data driver may convert the image data MDATA, obtained through modulation based on control by the controller 10, into a data voltage Vdata and may provide the data voltage Vdata to the screen. The data voltage Vdata may be supplied to the screen through the data line DL.

The gate driver may generate the scan signal SCAN on the basis of control by the controller 10 and may provide the scan signal SCAN to the screen on the basis of an application timing of the data voltage Vdata. The scan signal SCAN may be supplied to the screen through the gate line GL, and thus, a pixel line to which the data voltage Vdata is to be applied may be selected. The gate driver may be formed directly in a non-display area outside the screen of the display panel 30.

The luminance measurer CMR may photograph a test pattern displayed by the display panel 30 to generate a panel image including diagonal Mura. The luminance measurer CMR may be a camera CMR, but is not limited thereto.

The display defect detection circuit 40 may preprocess and edge-process the panel image input from the luminance measurer CMR and may calculate a final feature value of diagonal Mura by multiplying a first feature value, in which a luminance difference of the diagonal Mura is reflected, by a second feature value in which a shape ratio of the diagonal Mura is reflected and may detect a display position of the diagonal Mura on the basis of the final feature value of the diagonal Mura. The display position of the diagonal Mura detected by the display defect detection circuit 40 may be based on constructing a Mura compensation table. In the Mura compensation table, position information about the diagonal Mura may be read address information for reading a compensation value.

Figure 2:
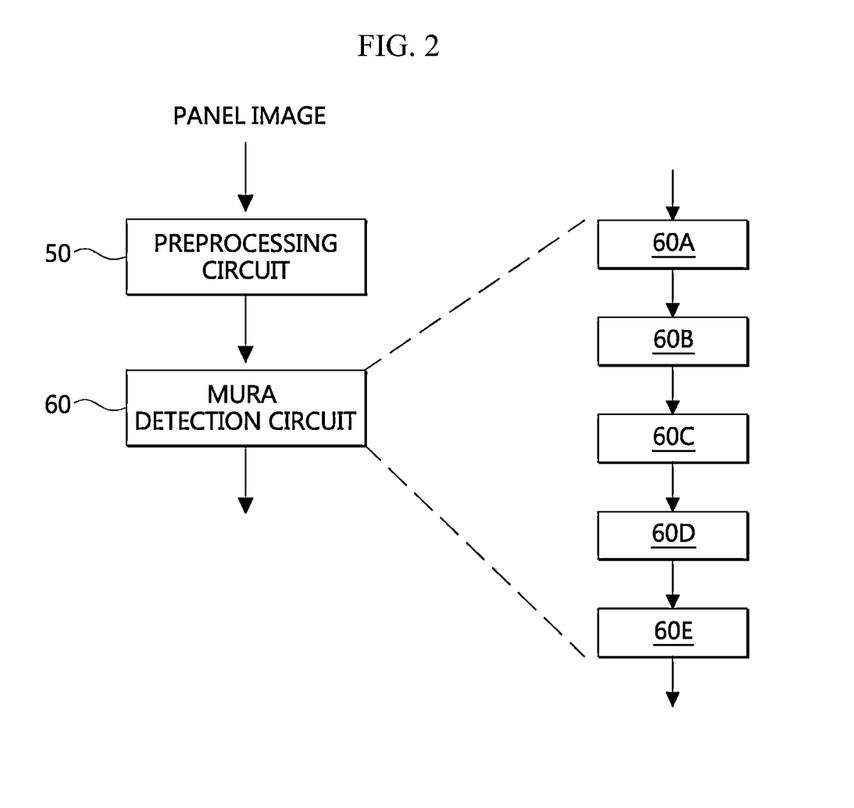
FIG. 2 is a diagram illustrating a display defect detection circuit of FIG. 1.
Figure 3:
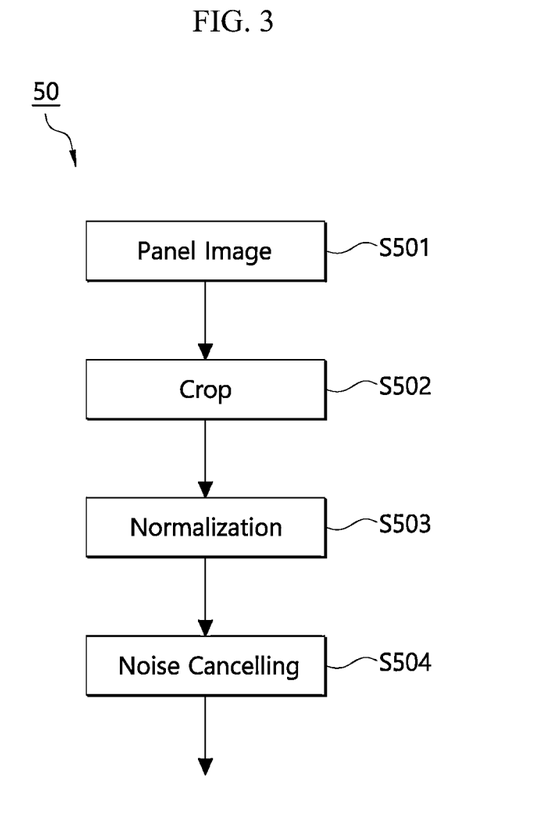
FIG. 3 is a diagram illustrating a preprocessing process performed by a preprocessing circuit of FIG. 2.
Figure 4:
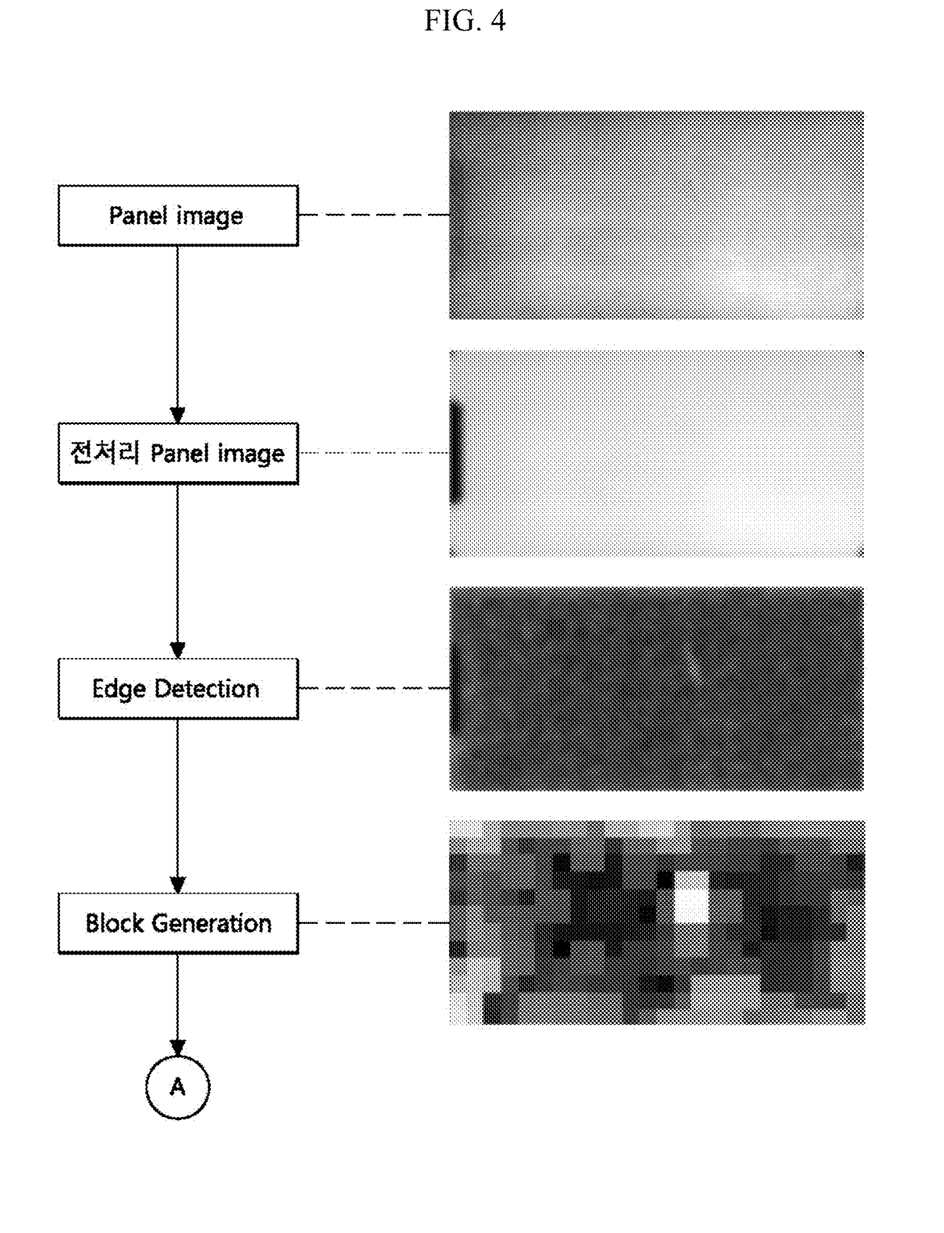
FIGS. 4 and 5 are diagrams illustrating a Mura detection process performed by the display defect detection circuit of FIG. 1.
Figure 5:
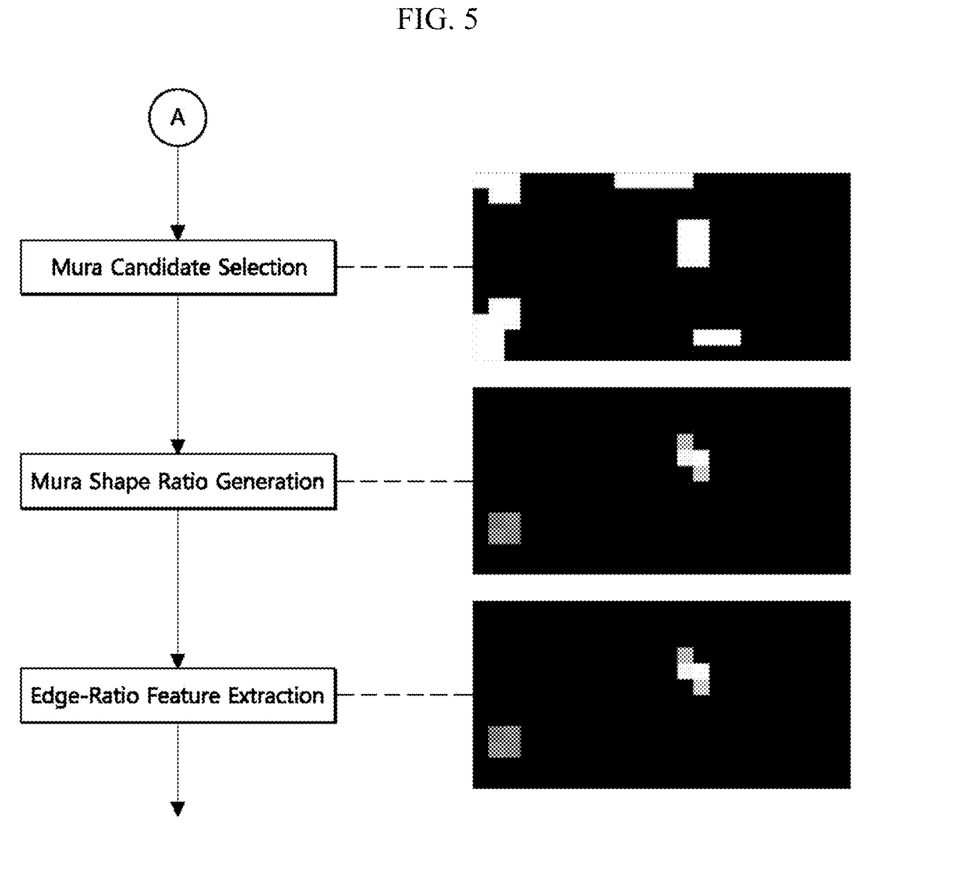
Figure 6:
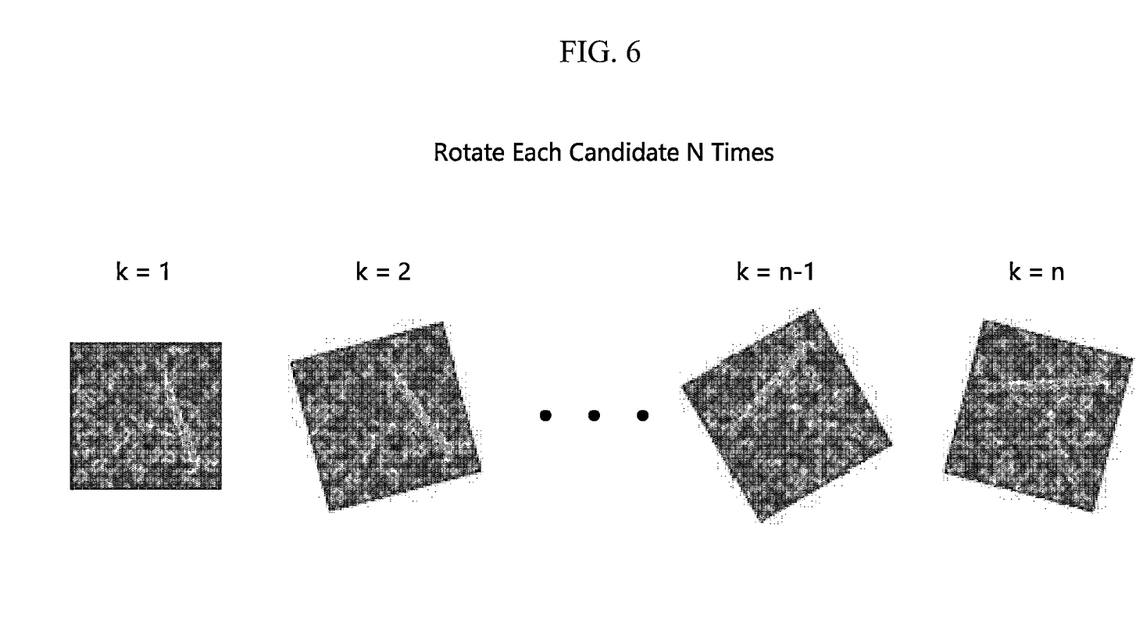
FIG. 6 is a diagram illustrating an example which rotates an edge map image of each of diagonal Mura candidates n times, on the basis of the number of angles "n"
Figure 7:
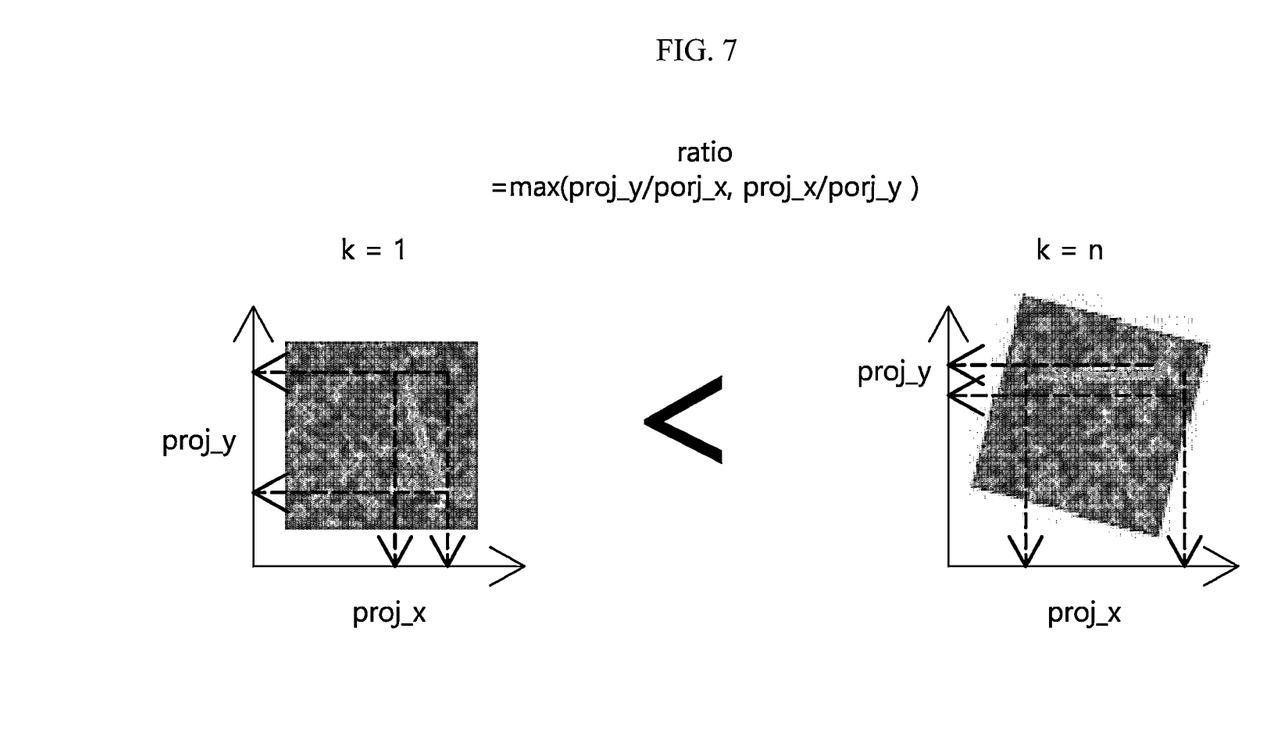
FIG. 7 is a diagram illustrating an example which calculates, as a shape ratio feature value of a corresponding diagonal Mura candidate, a largest ratio value among projection ratio values between an x-axis direction and a y-axis direction with respect to n number of angles.

FIG. 2 is a diagram illustrating a display defect detection circuit of FIG. 1. FIG. 3 is a diagram illustrating a preprocessing process performed by a preprocessing circuit of FIG. 2. FIGS. 4 and 5 are diagrams illustrating a Mura detection process performed by the display defect detection circuit of FIG. 1. FIG. 6 is a diagram illustrating an example which rotates an edge map image of each of diagonal Mura candidates n times, on the basis of the number of angles "n". FIG. 7 is a diagram illustrating an example which calculates, as a shape ratio feature value of a corresponding diagonal Mura candidate, a largest ratio value among projection ratio values between an x-axis direction and a y-axis direction with respect to n number of angles.

Referring to FIG. 2, the display defect detection circuit 40 may include a preprocessing circuit 50 and a Mura detection circuit 60.

The preprocessing circuit 50 may receive a capture image of a test pattern, displayed by the display panel, as a panel image including diagonal Mura and may preprocess the panel image to output a preprocessing image.

A preprocessing process performed by the preprocessing circuit 50 may include a process (S501) of receiving a panel image as in FIG. 3, a process (S502) of cropping the panel image to extract a region of interest (ROI) including diagonal Mura and changing a size of the ROI to a predetermined size, a process (S503) of normalizing a color sense or brightness of the ROI, and a process (S504) of removing a noise component, hindering detection of the diagonal Mura, from the ROI. In order to remove the noise component included in the ROI, the preprocessing circuit 50 may include a filtering-based algorithm (Gaussian, Bilateral filtering, etc.).

The accuracy of Mura detection may be reduced by a performance deviation and a noise component of the panel image based on a photograph environment or a panel characteristic, and such a side effect may be reduced by the preprocessing process.

The Mura detection circuit 60 may include an edge detector 60A, a block calculator 60B, a Mura candidate selector 60C, a shape ratio calculator 60D, and a final feature value calculator 60E. The Mura detection circuit 60 will be described below in detail with reference to FIGS. 4 to 7.

The edge detector 60A may generate an edge map image including edge information about a preprocessing image (see an edge detection image of FIG. 4). To this end, the edge detector 60A may include a Sobel filter. The edge detector 60A may detect edge features in an x-axis direction and a y-axis direction by using the Sobel filter and may weight-average the edge features to generate the edge map image. The edge map image generated by the Sobel filter may be a binary image.

The block calculator 60B may divide the edge map image by block units and may calculate a block edge feature value corresponding to each edge map block image (see a block generation image of FIG. 4). When an arithmetic operation is performed on the edge map image by block units, an operation speed may be fast, and a block edge feature value having a reinforced local characteristic may be obtained. In order not to miss Mura located in a boundary region between blocks, the block calculator 60B may perform an arithmetic operation on adjacent blocks which overlap partially.

The Mura candidate selector 60C may select an edge map block image, where a block edge feature value is greater than or equal to a reference value, as a Mura candidate image from among edge map block images (see a Mura candidate selection image of FIG. 5). The Mura candidate selector 60C may select an edge map block image, where a block edge feature value is upper 10%, as a Mura candidate image from among the edge map block images and may filter out and remove an edge map block image where a block edge feature value is less than upper 10%, thereby increasing the accuracy of Mura detection. Referring to the Mura candidate selection image of FIG. 5, it may be checked that an edge map block image, where a block edge feature value is less than upper 10%, is filtered out and removed. The Mura candidate image may be a binary image.

The shape ratio calculator 60D may project diagonal Mura, included in a Mura candidate image, in an x-axis direction and a y-axis direction at each angle while rotating the Mura candidate image on the basis of the number of angles "n" as in FIGS. 6 and 7 and may calculate, as a shape ratio feature value of the diagonal Mura, a projection ratio value corresponding to an angle where a projection ratio value between the x-axis direction and the y-axis direction is largest (see a Mura shape ratio generation image of FIG. 5).

As in FIG. 7, the projection ratio value between the x-axis direction and the y-axis direction may include a first ratio value obtained by dividing an x axis-direction projection value (proj_x) by a y axis-direction projection value (proj_y) and a second ratio value obtained by dividing the y axis-direction projection value (proj_y) by the x axis-direction projection value (proj_x). The shape ratio calculator 60D may calculate n number of first ratio values and n number of second ratio values with respect to all angles 1 to n and may calculate, as a shape ratio feature value of diagonal Mura, one largest ratio value of the n first ratio values and the n second ratio values.

The final feature value calculator 60E may multiply a first feature value, which is a block edge feature value of the Mura candidate image, by a second feature value which is the shape ratio feature value of the diagonal Mura, thereby calculating a luminance-shape ratio feature value indicating the final feature value of the diagonal Mura (see an edge-ratio feature extraction image of FIG. 5).

Moreover, in FIG. 5, it is illustrated that the Mura shape ratio generation image is similar to the edge-ratio feature extraction image, but a shape ratio feature value of diagonal Mura included in the Mura shape ratio generation image may differ from a luminance-shape ratio feature value included in the edge-ratio feature extraction image.

As described above, the Mura detection circuit 60 according to the present embodiment may further consider the degree of slope of diagonal Mura and a widthwise-lengthwise ratio of diagonal Mura in a Mura detection process, and thus, may more accurately detect diagonal Mura which is not detected through a conventional Mura detection algorithm.

The Mura detection circuit 60 according to the present embodiment may accurately detect diagonal Mura differentiated from dotted Mura, band Mura, non-formal Mura, and general linear Mura.

A display defect detection method according to an embodiment of the present disclosure may be based on the display defect detection system described above.

The display defect detection method according to an embodiment of the present disclosure may include a step of receiving a capture image of a test pattern, displayed by the display panel, as a panel image including diagonal Mura and preprocessing the panel image to output a preprocessing image, a step of calculating a final feature value of the diagonal Mura by multiplying a first feature value, in which a luminance difference of the diagonal Mura is reflected, by a second feature value in which a shape ratio of the diagonal Mura is reflected, on the basis of an edge map of the preprocessing image, and a step of detecting a display position of the diagonal Mura on the basis of the final feature value of the diagonal Mura.

In the display defect detection method, a process of calculating the final feature value of the diagonal Mura may include a step of generating an edge map image including edge information about the preprocessing image, a step of dividing the edge map image by block units and calculating a block edge feature value corresponding to each edge map block image, a step of selecting an edge map block image, where the block edge feature value is greater than or equal to a reference value, as a Mura candidate image from among the edge map block images, a step of projecting diagonal Mura included in the Mura candidate image in an x-axis direction and a y-axis direction with respect to each of a plurality of angles while rotating the Mura candidate image at the plurality of angles and calculating, as a shape ratio feature value of the diagonal Mura, a projection ratio value corresponding to an angle where a projection ratio value between the x-axis direction and the y-axis direction is largest, and a step of multiplying a block edge feature value of the Mura candidate image indicating the first feature value by a shape ratio feature value of the diagonal Mura indicating the second feature value to calculate a luminance-shape ratio feature value indicating the final feature value of the diagonal Mura.

In the embodiments of the present disclosure, the degree of slope of diagonal Mura and a widthwise-lengthwise ratio of diagonal Mura may be further considered in a Mura detection process, and thus, diagonal Mura which is not detected through a conventional Mura detection algorithm may be more accurately detected. Also, in the embodiments of the present disclosure, diagonal Mura differentiated from dotted Mura, band Mura, non-formal Mura, and general linear Mura may be accurately detected.

The effects according to the present disclosure are not limited to the above examples, and other various effects may be included in the specification.

It will be apparent to those skilled in the art that various modifications and variations can be made in the display defect detection system and the detection method thereof of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display defect detection system, comprising:
a preprocessing circuit receiving a capture image of a test pattern, displayed by a display panel, as a panel image including diagonal Mura and preprocessing the panel image to output a preprocessing image; and
a Mura detection circuit calculating a final feature value of the diagonal Mura by multiplying a first feature value, in which a luminance difference of the diagonal Mura is reflected, by a second feature value in which a shape ratio of the diagonal Mura is reflected, on the basis of an edge map of the preprocessing image, and detecting a display position of the diagonal Mura on the basis of the final feature value of the diagonal Mura.

2. The display defect detection system of claim 1, wherein a preprocessing process performed by the preprocessing circuit comprises:
a process of cropping the panel image to extract a region of interest ROI including the diagonal Mura and changing a size of the ROI to a predetermined size;
a process of normalizing a color sense or brightness of the ROI; and a process of removing a noise component, hindering detection of the diagonal Mura, from the normalized ROI.

3. The display defect detection system of claim 1, wherein the Mura detection circuit comprises:
an edge detector generating an edge map image including edge information about the preprocessing image;
a block calculator dividing the edge map image by block units and calculating a block edge feature value corresponding to each of edge map block images;
a Mura candidate selector selecting an edge map block image, where the block edge feature value is greater than or equal to a reference value, as a Mura candidate image from among the edge map block images;
a shape ratio calculator projecting diagonal Mura included in the Mura candidate image in an x-axis direction and a y-axis direction with respect to each of a plurality of angles while rotating the Mura candidate image at the plurality of angles and calculating, as a shape ratio feature value of the diagonal Mura, a projection ratio value corresponding to an angle where a projection ratio value between the x-axis direction and the y-axis direction is largest; and
a final feature value calculator multiplying a block edge feature value of the Mura candidate image indicating the first feature value by a shape ratio feature value of the diagonal Mura indicating the second feature value to calculate a luminance-shape ratio feature value indicating the final feature value of the diagonal Mura.

4. The display defect detection system of claim 3, wherein each of the edge map image and the Mura candidate image is a binary image.

5. The display defect detection system of claim 3, wherein the Mura candidate selector selects an edge map block image, where the block edge feature value is upper 10%, as the Mura candidate image from among the edge map block images and filters out and removes an edge map block image where the block edge feature value is less than upper 10%.

6. The display defect detection system of claim 3, wherein the projection ratio value between the x-axis direction and the y-axis direction comprises a first ratio value obtained by dividing an x axis-direction projection value by a y axis-direction projection value and a second ratio value obtained by dividing the y axis-direction projection value by the x axis-direction projection value.

7. The display defect detection system of claim 6, wherein the shape ratio calculator calculates a plurality of first ratio values and a plurality of second ratio values with respect to the plurality of angles and calculates, as a shape ratio feature value of the diagonal Mura, one largest ratio value of the plurality of first ratio values and the plurality of second ratio values.

8. The display defect detection system of claim 3, wherein the edge detector detects edge features in an x-axis direction and a y-axis direction by using a Sobel filter and weight-averages the edge features to generate the edge map image.

9. A display defect detection method, comprising:
receiving a capture image of a test pattern, displayed by a display panel, as a panel image including diagonal Mura and preprocessing the panel image to output a preprocessing image;
calculating a final feature value of the diagonal Mura by multiplying a first feature value, in which a luminance difference of the diagonal Mura is reflected, by a second feature value in which a shape ratio of the diagonal Mura is reflected, on the basis of an edge map of the preprocessing image; and
detecting a display position of the diagonal Mura on the basis of the final feature value of the diagonal Mura.

10. The display defect detection method of claim 9, wherein the preprocessing the panel image comprises:
cropping the panel image to extract a region of interest ROI including the diagonal Mura and changing a size of the ROI to a predetermined size;
normalizing a color sense or brightness of the ROI; and
removing a noise component, hindering detection of the diagonal Mura, from the normalized ROI.

11. The display defect detection method of claim 9, wherein the calculating the final feature value of the diagonal Mura comprises:
generating an edge map image including edge information about the preprocessing image;
dividing the edge map image by block units and calculating a block edge feature value corresponding to each of edge map block images;
selecting an edge map block image, where the block edge feature value is greater than or equal to a reference value, as a Mura candidate image from among the edge map block images;
projecting diagonal Mura included in the Mura candidate image in an x-axis direction and a y-axis direction with respect to each of a plurality of angles while rotating the Mura candidate image at the plurality of angles and calculating, as a shape ratio feature value of the diagonal Mura, a projection ratio value corresponding to an angle where a projection ratio value between the x-axis direction and the y-axis direction is largest; and
multiplying a block edge feature value of the Mura candidate image indicating the first feature value by a shape ratio feature value of the diagonal Mura indicating the second feature value to calculate a luminance-shape ratio feature value indicating the final feature value of the diagonal Mura.

12. The display defect detection method of claim 11, wherein each of the edge map image and the Mura candidate image is a binary image.

13. The display defect detection method of claim 11, wherein the selecting the Mura candidate image comprises:
selecting an edge map block image, where the block edge feature value is upper 10%, as the Mura candidate image from among the edge map block images; and
filtering out and removing an edge map block image where the block edge feature value is less than upper 10%.

14. The display defect detection method of claim 11, wherein the projection ratio value between the x-axis direction and the y-axis direction comprises a first ratio value obtained by dividing an x axis-direction projection value by a y axis-direction projection value and a second ratio value obtained by dividing the y axis-direction projection value by the x axis-direction projection value.

15. The display defect detection method of claim 14, wherein the calculating the projection ratio value as the shape ratio feature value comprises:
calculating a plurality of first ratio values and a plurality of second ratio values with respect to the plurality of angles; and
calculating, as a shape ratio feature value of the diagonal Mura, one largest ratio value of the plurality of first ratio values and the plurality of second ratio values.

16. The display defect detection method of claim 11, wherein the generating the edge map image comprises:
detecting edge features in an x-axis direction and a y-axis direction by using a Sobel filter and weight-averaging the edge features to generate the edge map image.

* * * * *